United States Patent

[11] 3,577,078

| [72] | Inventors | Willy Kisselmann<br>Grunwald;<br>Fritz Rumpelein, Munich; Paul Kopf,<br>Franz Landbrecht, Unterhaching,<br>Germany |
|---|---|---|
| [21] | Appl. No. | 811,739 |
| [22] | Filed | Apr. 1, 1969 |
| [45] | Patented | May 4, 1971 |
| [73] | Assignee | Agfa-Gevaert Aktiengesellschaft<br>Leverkusen, Germany |
| [32] | Priority | Apr. 3, 1968 |
| [33] | | Germany |
| [31] | | P 17 66 101.7 |

[54] ELECTRICAL MEASURING OR INDICATING INSTRUMENT
9 Claims, 3 Drawing Figs.

[52] U.S. Cl. .................................................... 324/154
[51] Int. Cl. ........................................................ G01r 1/00
[50] Field of Search........................................... 324/125,
151, 151 (A), 154, 155; 116/129

[56] References Cited
UNITED STATES PATENTS
2,425,595  8/1947  Butler............................ 324/155
FOREIGN PATENTS
927,546  5/1963  Great Britain................ 324/151(A)
1,171,076  5/1964  Germany....................... 324/151

*Primary Examiner*—Alfred E. Smith
*Attorney*—Michael S. Striker

ABSTRACT: A moving-coil instrument wherein the end positions of the pointer which shares oscillatory movements of the coil are determined by two elastic paper strips. The strips have inner portions which are received in slots provided therefor in a support which constitutes or includes the instrument housing, and outer portions having transversely extending edges which abut against the pointer when the latter assumes the corresponding end position. The strips are adjustable with reference to the support to facilitate calibration of the instrument and are thereupon bonded to the support.

PATENTED MAY 4 1971

3,577,078

INVENTOR.
WILLY KISSELMANN
FRITZ RÜMPELEIN
PAUL KOPF
FRANZ LANDBRECHT

BY

Michael S. Striker

ELECTRICAL MEASURING OR INDICATING INSTRUMENT

BACKGROUND OF THE INVENTION

The present invention relates to moving-coil measuring instruments in general, and more particularly to improvements in moving-coil instruments of the type wherein the pointer which shares oscillatory movements of the coil is movable to one or two end positions which are determined by stops. Still more particularly, the invention relates to moving-coil measuring instruments wherein the stop or stops for the pointer are designed and installed in a novel way.

SUMMARY OF THE INVENTION

An object of the invention is to provide a moving-coil instrument, for example, a voltmeter or a galvanometer, for use in photographic apparatus or the like, wherein the end position or positions of the pointer can be determined in a novel and time-saving way.

Another object of the invention is to provide a moving-coil instrument wherein the pointer does not tend to adhere to the stop or stops which serve to arrest the pointer in its end positions.

A further object of the invention is to provide a simple, efficient and time-saving method of calibrating a moving-coil measuring instrument.

An additional object of the invention is to provide a moving-coil measuring instrument with a housing wherein the stop or stops for the pointer are mounted in a novel way.

The invention is embodied in a moving-coil measuring instrument which comprises a coil movable about a predetermined axis toward and away from at least one end position, a pointer which is movable with the coil (such pointer is normally integral with or mounted on the coil frame), support means for the coil, and abutment means for arresting the pointer in the end position of the coil. The abutment means comprises a substantially strip-shaped member, preferably consisting of paper which is substantially free of fibers and exhibits at least some elasticity in response to deformation transversely of the longitudinal direction of the strip-shaped member. A first portion of the member is mounted in the support means and the remaining second portion of the member extends from the support means and into the path of movement of the pointer toward its end position.

The first portion of the strip-shaped member is preferably received in an elongated recess or slot of the support means and is adjustable lengthwise of such slot to thus enable the person in charge to calibrate the instrument, i.e., to select the end position of the coil. Once the member is properly adjusted with reference to the support means, it is preferably permanently secured thereto, for example, by bonding with a suitable adhesive or the like. The support means may constitute or include the housing of the instrument; for example, the housing and the magnet of the instrument may define an arcuate slot for the first portion of the strip-shaped member. In accordance with a modification of our invention, the housing may cooperate with a clamping element to define therewith a curved recess for the first portion of the strip-shaped member, or the housing may be provided with a slotted extension for such member.

The novel features which are considered as characteristic of the invention are set forth in particular in the appended claims. The improved measuring instrument itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
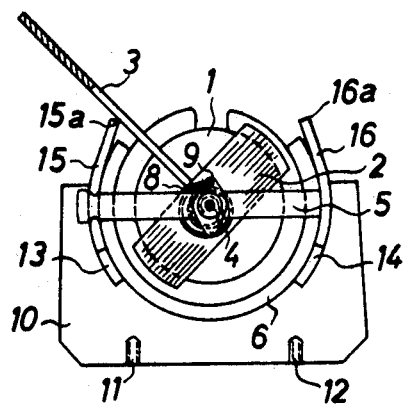
FIG. 1 is a schematic plan view of a moving-coil measuring instrument which embodies one form of our invention.

Referring to FIG. 1, there is shown a moving-coil measuring instrument which comprises a fixed core 1 and a moving coil 2 whose frame is provided with inwardly extending pivot members received in suitable sockets so that the coil can oscillate back and forth around the core. The frame for the coil 2 is provided with a customary pointer 3. One side of the coil 2 is further mounted in a threaded bearing member 4 which is carried by a bridge member 5 extending across a ring-shaped magnet 6. A holder 9 which is mounted on the bridge member 5 is connected with two torsion springs 8 which serve to return the coil 2 and its frame to zero position.

The heretofore described parts of the instrument are mounted in a housing 10 which is formed with two tapped bores 11, 12. The configuration of the housing 10 is such that is defines with the adjoining portion of the magnet 6 a pair of arcuate slots or recesses 13, 14 serving to receive two strip-shaped abutments or stops 15, 16 for the pointer 3. The length of stops 15, 16 is selected in such a way that their outer portions extend beyond the open ends of the respective recesses 13, 14 and into the path of movement of the pointer 3. Thus, each of the stops 15, 16 can arrest the pointer 3 in one of its end positions, it being assumed that the zero position of the pointer is somewhere between such end positions. In order to reduce the area of contact between the outer end portions of the stops 15, 16 and the pointer 3, the stops are formed with sharply defined end faces which are inclined with reference to the adjoining surface of the pointer 3 when the latter assumes the corresponding end position so that the pointer then merely abuts against a transversely extending edge 15a or 16a of the respective stop.

In order to facilitate rapid and convenient calibration of the instrument, the stops 15, 16 are preferably shiftable lengthwise of the respective recesses 13, 14. Once they assume the desired positions, the stops 15, 16 are fixed in such positions, preferably by an adhesive. The stops 15, 16 preferably (but not necessarily) consist of paper, particularly a paper which is at least substantially free of fibers. An important advantage of stops which consist of such paper is that the pointer 3 does not tend to adhere thereto when it reaches the corresponding end position. Furthermore, the stops can be readily shifted prior to application of adhesive so that the calibration of the instrument can be carried out rapidly and with a high degree of accuracy. Another important advantage of paper stops is that they are inherently elastic, particularly as regards flexing at right angles to their longitudinal directions. Thus, the pointer 3 can flex the stop 15 or 16 when it moves toward and reaches the corresponding end position but the thus deformed stop thereupon reassumes its normal position. The parts 6 and 10 together constitute a support for the inner portions of the stops 15 and 16.

Figure 2:
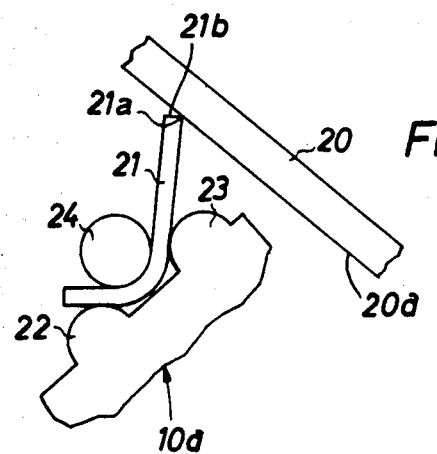
FIG. 2 is an enlarged view of a detail in a second instrument.

FIG. 2 illustrates a portion of a second moving-coil measuring instrument. The pointer 20 corresponds to the pointer 3 of FIG. 1 and the part denoted by the numeral 10a constitutes a housing and is provided with two projections 22, 23. A clamping element 24 extends into the space between the projections 22, 23 and defines therewith an arcuate channel or recess for a portion of a strip-shaped abutment or stop 21 corresponding to the stop 15 or 16 of FIG. 1. The instrument including the structure of FIG. 2 is calibrated by shifting the stop 21 lengthwise to a desired position. If the clamping action of the element 24 is not sufficient, the properly adjusted stop 21 can be fixed in final position by application of a suitable adhesive or the like. The numeral 21a denotes a transversely extending edge at the outer end face of the stop 21; this edge 21a abuts against the adjoining side surface 20a of the pointer 20 when the latter assumes the illustrated end position. The other stop for the instrument which includes the structure of FIG. 2 is designed and mounted in the same way as the stop 21. Each stop preferably consists of paper and exhibits at least some elasticity.

FIG. 2 shows clearly that the end face 21b of the exposed portion of the stop 21 defines with the adjoining side surface 20a of the pointer 20 an acute angle when the side surface 20a abuts against the edge 21a. The same holds true for the exposed end faces of the stops 15, 16 shown in FIG. 1.

Figure 3:
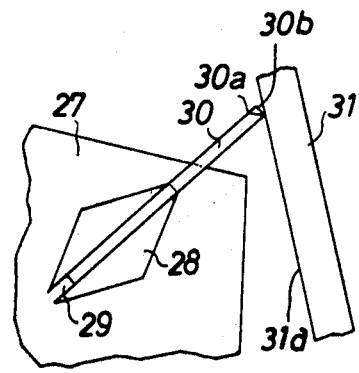
FIG. 3 is a similar view of a detail in a third instrument.

FIG. 3 illustrates a portion of a third measuring instrument which includes a housing 27 provided with an extension or boss 28 which is formed with an elongated recess or slot 29 for a portion of a strip-shaped abutment or stop 30. The pointer 31 is shown in its end position in which its side surface 31a abuts against the edge 30a at the front end face 30b of the stop 30. Once the stop 30 is properly adjusted with reference to the support 27, it is fixedly secured to the extension 28 by resorting to an adhesive or in another suitable way. The instrument embodying the structure of FIG. 3 may be provided with two stops 30, and such stops preferably consist of paper or like material which exhibits at least some elasticity and does not tend to attract the pointer 31.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

We claim:

1. In an electrical measuring or indicating instrument, a combination comprising a coil movable about a predetermined axis to and from at least one end position; a pointer movable with said coil; support means for said coil; and abutment means for arresting said pointer in the end position of said coil, comprising a substantially strip-shaped member having a first portion mounted in said support means and a second portion extending into the path of movement of said pointer, said second portion of said member being elastically deformable substantially transversely of the longitudinal direction of said member, at least said second portion of said member consisting of paper which is at least substantially free of fibers to reduce the likelihood of clinging of the pointer to said second portion in the end position of said coil.

2. A combination as defined in claim 1, wherein said support means defines a recess for said first portion of said strip-shaped member.

3. A combination as defined in claim 2, wherein said recess is a slot and said support means comprises a housing flanking one side of said slot and a magnet flanking the other side of said slot.

4. A combination as defined in claim 2, wherein said support means comprises a housing having a pair of projections and clamping means located between said projections and defining therewith a curved slot which constitutes said recess.

5. A combination as defined in claim 2, wherein said support means comprises a housing having an extension which is provided with an elongated slot constituting said recess.

6. A combination as defined in claim 1, wherein said strip-shaped member is adjustable with reference to said support means to facilitate selection of said end position for said coil and said pointer.

7. A combination as defined in claim 1, wherein said first portion of said strip-shaped member is bonded to said support means.

8. A combination as defined in claim 1, wherein said second portion of said strip-shaped member has a substantially transversely extending edge which abuts against said pointer in the end position of said coil.

9. A combination as defined in claim 8, wherein said second portion has an end face adjacent to said edge and said pointer has a side surface which abuts against said edge and makes with said end face an acute angle in the end position of said coil.